United States Patent [19]

Powlus

[11] Patent Number: 4,581,837
[45] Date of Patent: Apr. 15, 1986

[54] HUNTER'S BLIND

[76] Inventor: Joe Powlus, 433 Gardner Ave., Twin Falls, Id. 83301

[21] Appl. No.: 700,042

[22] Filed: Feb. 11, 1985

[51] Int. Cl.⁴ ........................................... A01M 31/02
[52] U.S. Cl. .............................................. 43/1; 43/2
[58] Field of Search ..................................... 43/1, 2, 3

[56] References Cited

U.S. PATENT DOCUMENTS

| | | | |
|---|---|---|---|
| 395,189 | 12/1888 | Stanton | 43/1 |
| 586,145 | 7/1897 | Sievers | 43/1 |
| 2,501,517 | 3/1950 | Honald | 43/1 |
| 2,992,503 | 7/1961 | Webb | 43/1 |
| 4,164,089 | 8/1979 | George | 43/1 |

*Primary Examiner*—Gene P. Crosby
*Attorney, Agent, or Firm*—Frank J. Dykas

[57] ABSTRACT

A hunter's blind for hunting wild geese is disclosed having a hollow shell shaped as a feeding goose. The hollow shell holds a hunter in the sitting position, and has a door covering an access opening in the hollow shell. The door has viewing ports with colored screen material to camouflage their existence. The viewing ports are shaped to appear as layers of feathers.

3 Claims, 4 Drawing Figures

HUNTER'S BLIND

BACKGROUND OF THE INVENTION

1. Field of the Invention

The field of the invention relates to the construction of a hunter's blind for use when hunting wild geese. In particular, the construction of a portable blind which can be moved to the hunting site.

2. Description of the Prior Art

In order to adequately understand the significance of the present invention it is necessary to understand how water fowl, in particular wild geese, are hunted in the fields. In order to do so requires some background information concerning behavioral patterns and habits of wild geese.

Typically, wild geese roost in river areas at night and fly to fields where food is available to them and feed during the day. It is well known that geese flying in a flock will discover a field such as a corn field containing food, and will return to the field, day after day, feeding in the early morning and late evening hours until all of the food in the field has been consumed. The typical pattern is that the birds will circle the area of the field they desire to land in, carefully examining it for signs of waiting predators or other unusual circumstances which may be dangerous to their safety. Upon circling the area and determining it is safe to land, they will normally land as a group. The final, landing approach will be an upwind approach.

Once on the ground the flock will have certain members usually on the periphery of the flock, who will act as sentinels. They will stand with their heads upright watching for any signs of danger. A feeding goose has, of course, his head down to the ground.

If danger is spotted, the sentinal geese will sound the alarm and the entire flock will fly hopefully to safety.

Geese rely on a sense of smell to detect danger as well as their visual acuity. There are certain behavioral patterns which can be relied upon. The first is that a flock of geese will, when feeding in a field, work their way upwind. Additionally, when landing in a field they will make an upwind approach.

The traditional methods of field hunting geese typically involve the use of one or more hunter's blinds and decoys. The hunters survey the available the fields within 25 miles of the water roosting area to discover which fields are being worked by the geese. After the fields are identified, at night, when the geese are roosting on the water, a hole is dug in the ground in the area where the geese have been feeding and a cover is constructed from local foliage to cover the hole, thus creating the blind. Typically, the holes are quite shallow and the goose hunter is required to lay on his back underneath the blind. Decoys are set out in the field in the area where it is desired that the geese land.

The geese when making their morning trip to the feeding area see the goose decoys on the ground and presumably assume it is safe to land there, and hopefully, they are less cautious and actually do in fact attempt to land. As the geese get near the hunter tosses off the cover of his blind and begins to shoot at the geese.

Geese avoid landing in fields where there are structures such as fences and buildings in the immediate vicinity. Geese prefer to land in open areas where the sentinels can provide adequate warning of the approach of a preditor. Therefore, it is well known in the field that in order to hunt geese you must remove your car from the vicinity. Above ground blinds cannot be used unless they are in the shape of an animal known to be nonthreatening to wild geese. Such animal blinds have been in use for many years, however, none incorporate the viewing features of the present invention.

Scientific studies have been done to determine what type of decoy works best. The studies reveal that decoys that look as much like a goose as possible are by and far the most effective. It is has also been noted that geese are not sensitive to changes in size. The most effective goose decoys are what are commonly called magnum decoys in that they are two and sometimes three times the size of a normal wild goose. Geese do not react adversely to the large decoys and readily land amongst them.

In the course of doing said studies, it has been determined that a goose easily detects mistakes in the shape, coloring, and unusual and extraordinary motions, particularly rapid ones. As a result it is also well known to goose hunters that they must remain absolutely still and avoid the temptation of turning their face skyward to see the geese as they are approaching. The geese are able to easily detect the face of the human hunter, and it is common practice for hunters to darken their skin with grease or to grow beards prior to the hunt.

3. Object of the Invention

Accordingly, it is an object of this invention to develop an effective hunter's blind for goose hunting which does not require the hunter to lay on his back in a hole in the ground. It is the second object of this invention to create a hunter's blind which will also serve as an effective decoy and assist in attracting wild geese into firing range. A third object to provide view ports which allow the hunter to safely observe the approaching geese without detection.

SUMMARY OF THE INVENTION

These objects are accomplished by the use of a hunter's blind which is formed in the shape of a giant goose displayed in a feeding position. The blind is a hollow shell constructed of fiberglass material and formed in the shape of a shell of a large goose. Is large enough for a hunter to sit in. The blind is placed directly on the ground with the head of the goose blind pointed windward. The hunter then enters the hollow shell through access doors located on the back of the goose decoy and sits in the blind facing downwind, which is the direction that the geese will likely approach from. The hunter closes the access doors and awaits the arrival of the geese. When the geese arrive the hunter is then able to open the doors, raise his shotgun and shoot at the geese.

DETAILED DESCRIPTION OF THE PREFERRED EMBODIMENTS

Figure 1:
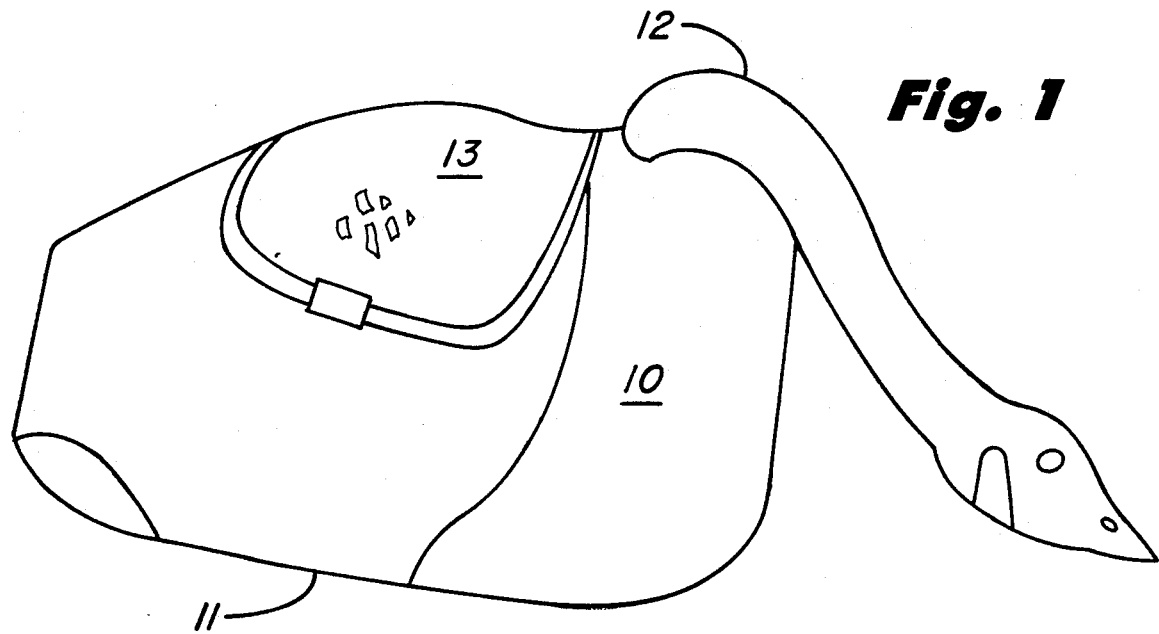
FIG. 1 is a perspective showing the shape of the perspective side view of the hunter's blind.

First referring to FIG. 1 the hunter's blind is generally identified as hunter's blind 10 as shown to advantage. Neck piece 12 is attached to shell 11 in such a manner as to depict a feeding goose.

Figure 4:
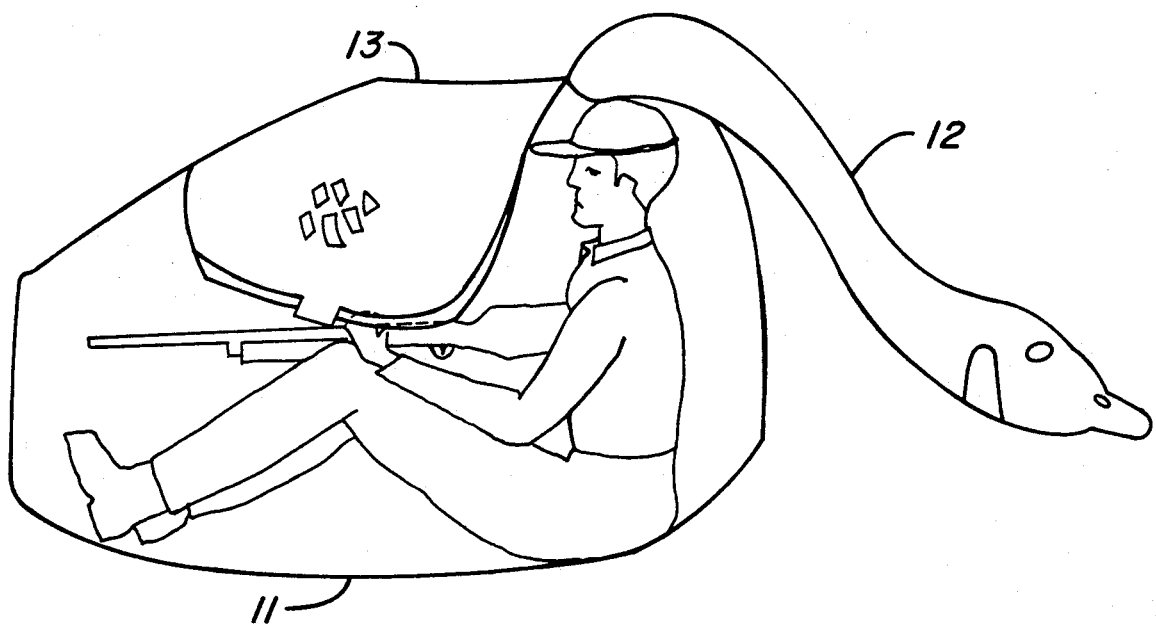
FIG. 4 is a side view showing the position of the hunter with the access doors closed.

Referring to FIGS. 1 and 4, shows the position of the hunter inside of blind 10 when access doors 13 and 14 are closed. In this position the hunter can remain concealed in the open field and still be able to see any approaching geese.

Figure 3:
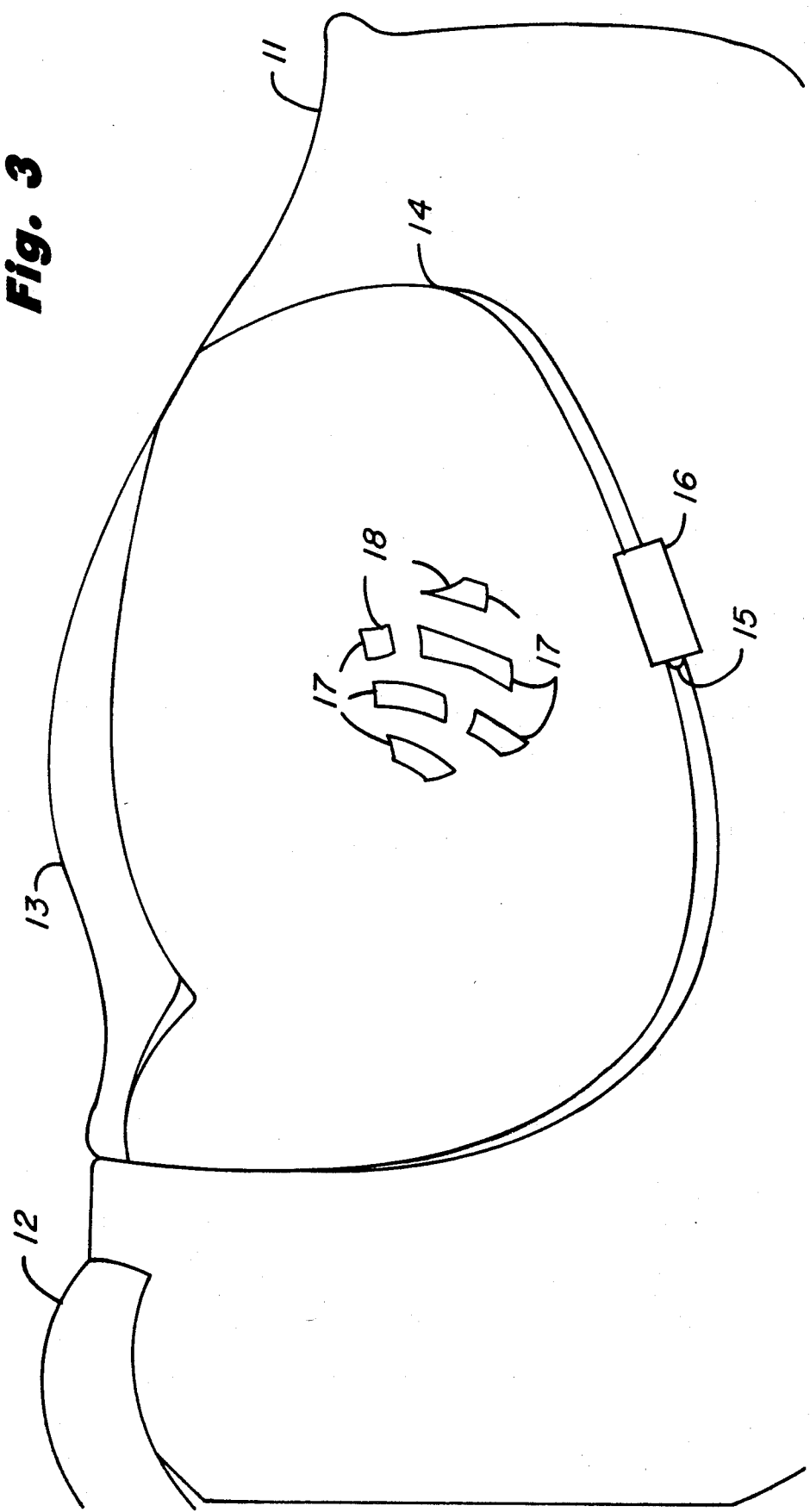
FIG. 3 is a detailed perspective view of the access doors showing the viewing ports.

FIG. 3 shows to advantage the viewing ports 17 which are cut into access doors 13 and 14. The viewing ports 17 are cut in such a manner as to conform to layers of feathers and are thusly camouflaged. To conceal the hunter's face when he is looking out through view ports 17 screens 18 made of dark nylon mesh covers view ports 17. The dark nylon mesh 18 provides further camouflage effect for view ports 17.

It should be apparent that acceptable blinds can be constructed which utilize one access door instead of two.

FIG. 3 also discloses to advantage hinge 15 which is covered with a resilient fabric material 16 in order to eliminate the possibility of any wild geese spotting the metal hinge.

Figure 2:
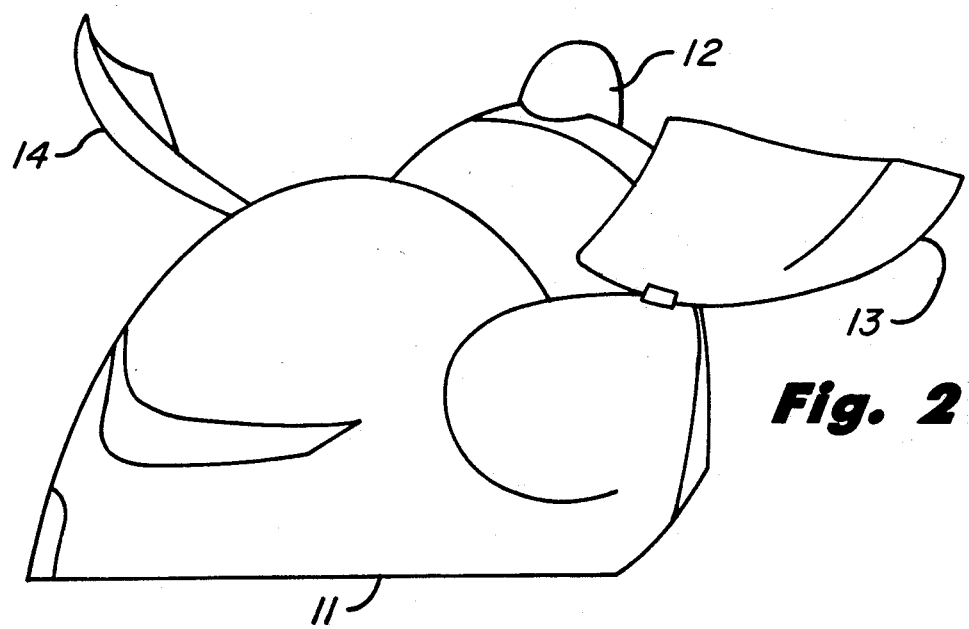
FIG. 2 is a perspective rear view showing the access doors open.

Referring to FIGS. 2 and 4, when the hunter observes wild geese approaching the decoys and he prepares himself and when the wild geese come within range he opens doors 13 and 14 as shown in FIG. 2 and commences to fire at the wild geese.

While there is shown and described the present preferred embodiment of the invention, it is to be distinctly understood that the invention is not limited thereto but may be variously embodied to practice within the scope of the following claims. Accordingly,

What I claim is:

1. A hunter's blind for hunting wild geese which comprises:

a hollow shell having coloring and shape to appear as a feeding goose, said hollow shell having a size to hold a hunter in a sitting position, facing rearwardly;

said hollow shell having a hunter access opening in the shell of sufficient size and shape to allow the hunter ingress and egress and allows him to move rapidly from a sitting position into a firing position;

a door covering the access opening;

hinges pivotarily attaching the door to the hollow shell;

a plurality of feather-shaped view ports disposed within the door of conforming size and shape so far as to appear as layers of feathers;

screen material covering said view ports, and colored so as to camouflage their existence.

2. The hunter's blind of claim 1 wherein the access door further comprises a pair of access doors, each hinged so as to open outwardly from the centerline away from each other.

3. The hunter's blind of claim 1 wherein said hunter's blind further comprises resilient camouflage material covering the hinges.

* * * * *